United States Patent Office 3,200,100
Patented Aug. 10, 1965

3,200,100
PROCESS FOR THE PRODUCTION OF ACRYLONITRILE POLYMERS
Ingofroh Dennstedt, Cologne-Buchforst, Germany, assignor to Farbenfabriken Bayer Aktiengesellschaft, Leverkusen, Germany, a German corporation
No Drawing. Filed Sept. 7, 1960, Ser. No. 54,363
Claims priority, application Germany, Sept. 11, 1959, F 29,367
9 Claims. (Cl. 260—85.5)

The invention relates to a process for the production of acrylonitrile polymers having particularly good thermostability.

It is known to polymerize acrylonitrile in aqueous medium at pH values below 7, by itself or in admixture with other vinyl compounds, by means of radical formers, advantageously with redox systems based on percompounds and sulphur compounds of low oxidation stages. The polymers obtained in this way serve for the production of shaped articles, filaments, fibers and the like. However, they frequently show the disadvantages of having low thermostability, which can lead to a strong yellowing, particularly at relatively high temperatures and in the presence of air. This is particularly disadvantageous when using the fiber materials produced therefrom. This phenomenon of insufficient thermostability is attributed inter alia to the presence of heavy metal ions, such as iron, which are incorporated therein from parts of the apparatus or due to the added ingredients, or which are also intentionally added for accelerating the polymerization.

It has consequently already been proposed to add complex formers for the heavy metal ions, in order to reduce their harmful influence on the discoloration. However, in such cases, there is such a reduction in the yield that the processes have no industrial importance.

It is an object of the present invention to make available such arcylonitrile polymers which show a light-colored raw color shade and have good thermal stability, especially in the presence of air. A further object consists in the development of a process for the production of these acrylonitrile polymers, which operates with very short reaction times and leads to high yields. Yet another object consists in so conducting the polymerization that suspensions, which can be satisfactorily filtered, are obtained. Further objects of the present invention will be apparent from the following description and the examples.

It has now been found possible to produce a very great acceleration of the polymerization when producing acrylonitrile polymers, a great increase in the yield and an improvement in the thermostability of the polymers if the polymerization is carried out in aqueous medium at pH values below 7 with the aid of radical formers and in the presence of aqueous dispersions of polymers, of complex formers for heavy metals, and if necessary in the simultaneous presence of water-soluble polyvalent metal salts and heavy metal ions.

The polymerization is carried out in a manner known per se taking into account the separately indicated measures. The essential feature is the addition of the aqueous dispersions of polymers.

It was not in any way possible to anticipate that this step, according to the invention, would produce the effects which are obtained thereby.

By polymers, there are understood here all compounds of high molecular weight, and especially to be emphasized are the polymers or co-polymers of acrylonitrile. It is found that, the more finely the dispersion is dispsersed, the more efficient is the acceleration effect. Such dispersions are obtained for example by subsequent emulsification, preferably by polymerization of the monomer in the presence of protective colloids or emulsifiers. Another possibility is provided by co-polymerizing the monomers with acid-unsaturated compounds, such as for example vinyl-sulphonic acid and emulsifiers or protective colloids. The quantities of polymer in the aqueous dispersions which are added depend on the effect which is desired, and these quantities are in the order of magnitude between 0.5 and 10%, preferably 2 to 4%, related to monomers which are to be polymerized.

It is preferred to use co-polymers built up on the one hand of acrylonitrile and on the other hand of one or more of the following vinyl compounds: esters of acrylic acid and methacrylic acid, styrene-vinyl chloride, vinylidene chloride and vinyl acetate, but also vinyl compounds with reactive groups, such as unsaturated amines, amides or unsaturated carboxylic acids or sulphonic acids (for example acrylic acid and styrene-sulphonic acid).

These homo-polymers or co-polymers, which are initially supplied, are polymerized in the same way as the polymerization of acrylonitrile in the presence of these initially supplied polymers.

By radical formers, there are to be understood all compounds which are, in known manner, able to initiate the polymerization, such as diacyl peroxides, dialkyl peroxides, hydrogen peroxide, alkyl hydroperoxide, aryl hydroperoxide and azo compounds (such as azo diisobutyric acid nitrile). Especially suitable for the polymerization are redox systems, such as the system based on persulphate and sulphur compounds of low oxidation stages.

The alkali metal salts, especially the sodium and potassium salts of persulphuric acid, are suitable as percompounds. The most important sulphur compounds of a low oxidation stage are: sulphur dioxide, alkali metal pyrosulphites, alkali metal bisulphites, alkali metal thiosulphates or the corresponding ammonium salts. The alkali metal salts which are especially suitable are the sodium and potassium salts. The per-compounds are used in quantities from 0.5 to 5%, preferably 1 to 2%, related to the monomers to be polymerized. The sulphur compounds of low oxidation stages are used in quantities from 0.5 to 10%, preferably 1 to 4%, related to the monomers which are to be polymerized. Smaller quantities of heavy metal ions can be added to the system for further activation.

These heavy metal ions, which are preferably added in the form of their salts (such as sulphates, chlorides or nitrates), comprise mainly the salts of divalent iron and copper. Generally speaking, quantities of 0.00001 to 0.1%, related to the monomers introduced, are sufficient.

The quantity of the complex formers to be added depends on the quantity of the heavy metal ions intentionally or unintentionally introduced and present in the polymerization system. Generally speaking, the quantity of complex formers should be far in excess of the equivalent weight of the heavy metal ions. Quantities of 0.05 to 10%, preferably 0.1 to 3%, based on the monomers to be polymerized, are preferred.

An additional effect as regards the acceleration of the polymerization, the thermostability of the polymers and the filtering capacity of the polyacrylonitrile suspensions which are obtained is provided by working in the presence of water-soluble, polyvalent metal salts, when using the steps which have been described above. To be considered as polyvalent metals are those which are able to form colorless or practically colorless ions. Included in this group are the water-soluble salts (such as chlorides, sulphates and nitrates), of calcium, magnesium, aluminium and zinc. The salts of aluminium (such as potassium-aluminium sulphate) have proved especially advantageous. These salts can be added before or during the polymerization and the quantity to be added is from 0.5 to 20%, preferably 1 to 3%, related to the monomers introduced. An improvement in the filtering capacity alone can also be achieved by adding water-soluble salts with monovalent cations, such as NaCl, $Na_2SO_4$, etc.

The process is suitable both for polymerizing acrylonitrile by itself and for co-polymerization with other vinyl compounds, for example esters of acrylic and methacrylic acid, styrene, vinyl chloride, vinylidene chloride and vinyl acetate; it is also possible to use vinyl compounds with reactive groups, such as unsaturated amines, amides or unsaturated carboxylic acids or sulphonic acids, for example acrylic acid, styrene-sulphonic acid, etc.

The polymerization according to the invention can itself be carried out in the usual manner, water serving as polymerization medium. Advantageously 500–1000 parts by weight of water are used to 100 parts by weight of monomer and the reaction temperatures are between 30 and 70° C., advantageously between 40 and 50° C. It has proved to be especially advantageous to start the polymerization with part of the reactions and auxiliaries and then continuously to add all constituents of the mixture.

The pH value, which is below 7 and advantageously between 2 and 3, is generally adjusted with dilute sulphuric acid, but other mineral acids can also be employed.

The polymerization carried out in accordance with the process of the invention starts extremely quickly, proceeds uniformly and quickly leads to conversions which are higher than 90%. When working in the presence of alum, the polyacrylonitrile suspensions are moreover obtained in such a dispersed form that they are easy to handle, filter and purify on an industrial scale. The polymers themselves are characterized by a very slight raw color tone and by an extremely small tendency to discoloration on being heated in the presence of air.

The adjustment of the desired molecular weight of the polymers can be effected by the polymerization temperature, by the quantity of the alum and particularly to the quantity of the radical formers.

The present invention is further disclosed in the following examples, which are illustrative but not limitative thereof.

EXAMPLE 1

180 parts by weight of water, 0.1 part by weight of sodium pyrosulphite and 4 parts by weight of a monomer mixture of 95 parts by weight of acrylonitrile and 5 parts by weight of methyl methacrylate are placed in a stirrer-type vessel, the receiver is adjusted to a pH value of 2.5 with sulphuric acid and heated to 45° C. The air had previously been replaced by nitrogen.

The following solutions are then run in from five separate vessels simultaneously and while stirring, within a period of 4 hours, the temperature being kept at 45° C.:

(a) 156 parts by weight of monomer mixture,
(b) 6.7 parts by weight of sodium pyrosulphite in 236 parts by weight of water,
(c) 2.3 parts by weight of potassium persulphate in 236 parts by weight of water,
(d) 1.6 parts by weight ethylene diamine tetraacetic acid as complex former in 236 parts by weight of water and adjusted with sulphuric acid to pH 7,
(e) 42 parts by weight normal $H_2SO_4$ and 196 parts by weight of water.

The mixture is stirred for another 2 hours, then 0.7 part by weight of sodium pyrosulphite and 0.2 part by weight of potassium persulphate, each in 50 parts by weight of water, are slowly added and stirring is continued for another hour at 45° C.

The polymer is suction-filtered, washed several times with water and dried at 50° C.

Only 26 parts by weight of polymer are obtained, this corresponding to a yield of 16.3%. The K-value of the polymer is 138 and the molecular weight is too high for spinning the polymer.

EXAMPLE 2

In this example, the acrylonitrile polymerization is carried out without complex former, such as ethylene diamine tetraacetic acid, but in the presence of a polymer dispersion of the co-polymer of 1 part by weight of acrylonitrile and 1 part by weight of potassium-styrene sulphonate (referred to as CAN–SS latex), potassium persulphate, sodium pyrosulphite and alum, polymers with a higher conversion being obtained than in Example 1, but with less satisfactory thermostability.

The CAN–SS latex was obtained as follows: in 100 parts by weight of water, 50 parts by weight of acrylonitrile, 50 parts of a mixture of the sodium salt of o- and p-styrene-sulphonic acid are polymerized with the aid of 1 part by weight of potassium persulphate and 1.6 parts by weight of sodium pyrosulphite at 30° C. and for 18 hours at a pH value of 2.5.

The polymerization of acrylonitrile and methyl acrylate in the ratio 95:5 is conducted as in Example 1, except that the solutions run in have the following composition:

(a) 156 parts by weight of monomer mixture,
(b) 3.36 parts by weight of sodium pyrosulphite in 236 parts by weight of water,
(c) 12 parts by weight of potassium persulphate in 236 parts by weight of water,
(d) 200 parts by weight of 3.3% aqueous CAN–SS latex +40 parts by weight of water,
(e) 112 parts by weight of a 5% aqueous alum solution +85 parts by weight of water+42 parts by weight of normal $H_2SO_4$.

The potassium-aluminum sulphate has less than 0.001% of iron. Working up was effected as in Example 1.

152 g. of polymer were obtained, corresponding to a conversion of 96%. The K-value of the polymer was 88. The films produced from this polymer were initially only slightly discolored on heating up to 173° C. in the presence of air, but yellowing occurred after a longer period.

EXAMPLE 3

In this example, the acrylonitrile polymerization in the presence of a CAN–SS latex, ethylene diamine tetraacetic acid, potassium persulphate, sodium pyrosulphite and alum is described, whereby conversions higher than 90% and polymers with very good thermostability are obtained.

The polymerization of acrylonitrile and methyl acrylate in the ratio of 95:5 is carried out in Example 1, except that the solutions run in have the following compositions:

(a) 156 parts by weight of monomer mixture,
(b) 6.7 parts by weight of sodium pyrosulphite+226 parts by weight of water+11 parts by weight of a 5% ethylene diamine tetraacetic acid solution,
(c) 2.3 parts by weight of potassium persulphate+226 by weight of water+11 parts by weight of a 5% aqueous ethylene diamine tetraacetic acid solution.
(d) 200 parts by weight of a 3.3% aqueous CAN–SS latex+26 parts by weight of water+11 parts by weight of a 5% aqueous ethylene diamine tetraacetic acid solution,
(e) 112 parts by weight of a 5% aqueous alum solution +85 parts by weight of water+42 parts by weight of normal $H_2SO_4$.

Working up was carried out as in Example 1.

150 g. of polymer were obtained, corresponding to a 90.5% conversion, and the K-value thereof was 85. The films produced from this polymer had a very good thermostability, there was practically no change in the color thereof after a heating period of 3 hours at 173° C., so that they have a substantially better thermostability than the films of Example 2.

*Summary of results of Examples 1 to 3*

| Example | Ethylene diamine tetraacetic acid | CAN-SS latex | Persulphate/ pyrosulphite | Alum | Conversion | K value | Thermo stability [1] |
|---|---|---|---|---|---|---|---|
| 1 | + | − | + | − | 16.3 | 138 | |
| 2 | − | + | + | + | 96 | 88 | Strong yellowing. |
| 3 | + | + | + | + | 90.5 | 83 | Practically unchanged. |

[1] Color of the film after 3 hrs. at 173° C.

Example 4

In a stirrer-type vessel flushed with nitrogen until free from air, there are placed 1375 parts by weight of distilled water, 6 parts by weight of potassium-aluminum sulphate, 2.5 parts by weight of a co-polymer of acrylonitrile and sodium vinyl sulphonate in the ratio 40:60, 25 parts by weight of normal sulphuric acid, 1 part by weight of ethylene diamine tetraacetic acid, 92.6 parts by weight of acrylonitrile and 4.9 parts by weight of methyl acrylate. The vessel is heated to 50° C. and 3.8 parts by weight of sodium pyrosulphite and 3.25 parts by weight of potassium persulphate are added.

The mixture is kept for 4 hours at 50° C. while stirring. The suspension which forms is filtered with suction, washed five times with distilled water and dried. The yield is 94 parts by weight = 92% of the theoretical of a pure white polymer. The films produced from this material have such a good thermostability that they remain practically unchanged in color even after heating for 3 hours at 173° C. The dyeing capacity with basic dyestuffs is excellent.

What we claim is:

1. In a process wherein acrylonitrile is polymerized at a pH below 7 in an aqueous dispersion containing a free radical-forming polymerization catalyst, 0.00001 to 0.1% by weight of monomer of a salt of a divalent metal selected from the group consisting of iron and copper, and a sufficient amount of a complex former to form a complex with said salt, the improvement which comprises conducting the aforesaid polymerization in the presence of 0.5 to 20% by weight of monomer of a water-soluble colorless aluminum salt and 0.5 to 10% by weight of of monomer of a latex of a sulfonic acid group-containing copolymer of an acrylic monomer, and recovering from the aqueous dispersion of the polymerized acrylonitrile.

2. The process of claim 1 wherein acrylonitrile is copolymerized with a mono-ethylenically unsaturated monomer which is coplymerizable therewith, the mixture of monomers containing at least 90% by weight of acrylonitrile.

3. The process of claim 2 wherein said monomer mixture is composed of 95% by weight of acrylonitrile and 5% by weight of methyl methacrylate.

4. The process of claim 2 wherein said aluminum salt is potassium aluminum sulfate.

5. The process of claim 2 wherein said salt of a divalent metal is selected from the group consisting of iron sulfate and copper sulfate.

6. The process of claim 2 wherein said sulfonic acid group-containing copolymer is a copolymer of acrylic acid and styrene-sulfonic acid.

7. The process of claim 2 wherin said sulfonic acid group-containing copolymer is a copolymer of acrylonitrile and potassium styrene-sulfonate.

8. The process of claim 2 wherein said sulfonic acid group-containing copolymer is a copolymer of acrylonitrile and sodium vinyl sulfonate.

9. In a process for the polymerization of a monomer mixture consisting of acrylonitrile and monoethylenically unsaturated monomer which is copolymerized therewith, said mixture containing at least 90% by weight of acrylonitrile, said polymerization being conducted at a pH below 7 in an aqueous dispersion containing 0.00001 to 0.1% by weight of the monomers of a salt of a divalent metal selected from the group consisting of a divalent iron and a divalent copper salt, 0.1 to 3% by weight of the monomers of ethylene diamine tetraacetic acid, and a free radical-forming polymerization catalyst, the improvement which comprises conducting the aforesaid polymerization in the presence of 0.5–20% by weight of monomer of a water-soluble colorless aluminum salt and in the presence of a dispersion containing 0.5 to 10% by weight of the monomers of a sulfonic acid group-containing copolymer selected from the group consisting of polyacrylic-styrene sulfonic acid, a polyacrylic-vinyl sulfonic acid, and salts thereof, and recovering from the aqueous dispersion the acrylonitrile copolymer.

References Cited by the Examiner

UNITED STATES PATENTS 2,631,142   3/53   Williams et al. _____ 260—82.5
2,751,374   6/56   Cresswell _____ 260—80
3,051,682   8/62   Ott _____ 260—85.5

OTHER REFERENCES

Heller et al., Chem. Abs. vol. 50, (1956), p. 10483f.

JOSEPH L. SCHOFER, *Primary Examiner.*

MILTON STERMAN, LOUISE P. QUAST, JOSEPH R. LIBERMAN, DONALD E. CZAJA, *Examiners.*